(No Model.)
J. YATES.
MACHINE FOR HULLING RICE.
No. 366,910. Patented July 19, 1887.
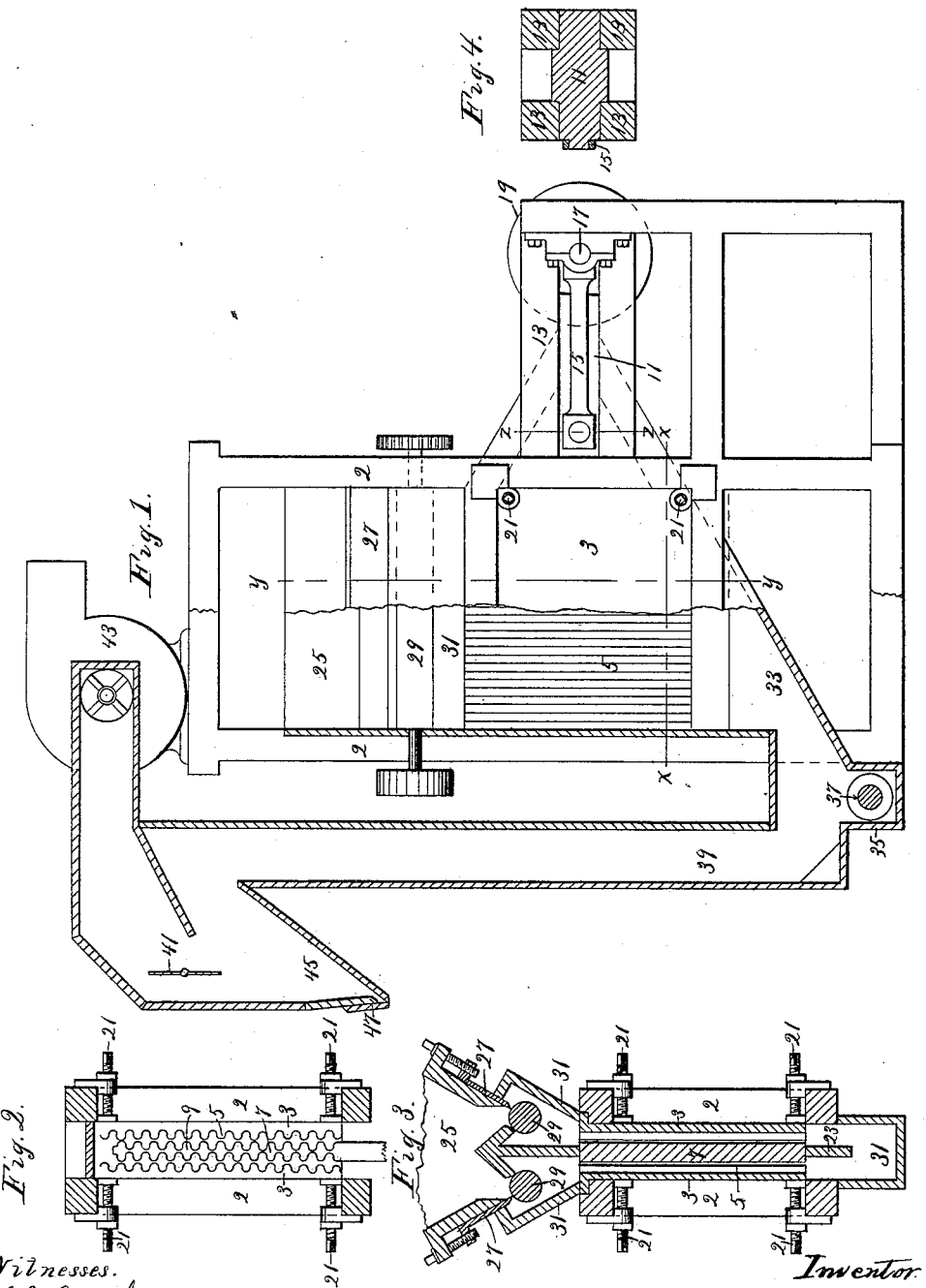
Witnesses.
S. J. Beardelee.
R. H. Sanford
Inventor
Joseph Yates.
By A. C. Paul Att'y.

UNITED STATES PATENT OFFICE.

JOSEPH YATES, OF MINNEAPOLIS, MINNESOTA.

MACHINE FOR HULLING RICE.

SPECIFICATION forming part of Letters Patent No. 366,910, dated July 19, 1887.

Application filed January 31, 1887. Serial No. 226,008. (No model.)

*To all whom it may concern:*

Be it known that I, JOSEPH YATES, of Minneapolis, in the county of Hennepin and State of Minnesota, have invented certain Improvements in Machines for Hulling Rice, of which the following is a specification.

This invention relates to improvements in machines for removing the hull from rice without injury to the rice-kernels; and the object I have in view is to provide a simple and inexpensive machine by which this work may be rapidly performed.

To this end the invention consists, generally, in the construction and combination hereinafter described, and particularly pointed out in the claims.

In the drawings forming part of this specification, Figure 1 is a side elevation of my machine partly broken away. Fig. 2 is a horizontal transverse section through the corrugated plates on line X X of Fig. 1. Fig. 3 is a transverse vertical section through the feed-hopper and corrugated plates on line Y Y, Fig. 1. Fig. 4 is a detail section on line Z Z, Fig. 1, showing the guide-bars and sliding cross-head.

In the drawings, 2 represents the frame of the machine, which may be of any suitable size and construction. Supported in this frame are the two upright plates 3, each having upon its inner face a series of vertical grooves or corrugations, 5. These grooves have preferably rounded bottoms, and the ridges between them have rounded tops, as shown in Fig. 2. A plate, 7, having similar grooves, 9, is arranged between the two plates 3, and is connected to a cross-head, 11, that moves between guide-bars 13. A pitman, 15, is connected with the cross-head 11, and with a suitable eccentric or crank-shaft, 17. The shaft 17 is provided with a pulley, 19, through which power may be applied to drive the shaft. The plates 3 are preferably provided with suitable adjustable screws, 21, by which the distance between these plates and the center plate 7 may be determined and regulated. The lower edge of the central plate 7 may rest upon a fixed bar, 23, as shown in Fig. 3.

Above the grooved plates is a feed-hopper, 25, having preferably two adjustable gates, 27, and two feed-rolls, 29. The feed-rolls may be driven by any suitable means. A chute, 31, beneath each feed-roll directs the rice as it passes the rolls into the spaces between the grooved plates. The rice enters the grooves between the plates with the kernels lengthwise in the grooves. As the center plate is given a slight reciprocatory motion between the other plates, the rice is rolled around in the grooves and the hull is loosened and drops off as the rice falls from the grooves. A chute, 33, is arranged beneath the grooved plates, and into this the rice falls. A conveyer-trough, 35, and conveyer 37 are arranged at the lowest point of the chute for conveying the hulled rice into a suitable spout or receptacle. An aspirating-trunk, 39, having a regulating-valve, 41, is connected with the chute 33, and at its upper end is connected with a fan, 43. A separating-chamber, 45, having a valve, 47, is arranged in the air-trunk, as shown in Fig. 1. The hulls and light material separated from the rice are drawn up the air-trunk, the heavier material settles in the chamber 45, and the lightest material is blown out of the fan-casing.

Any desired number of grooved plates may be used. If preferred, several sets may be placed side by side, or only two plates—one fixed and one movable—need be used.

I claim as my invention—

1. The combination, in a machine of the class described, with the vertical plates 3, having the grooves 5, with the rounded ridges between them, of the plate 7, having the similar grooves 9, and means for reciprocating said plate 7, all substantially as described.

2. The combination, in a machine of the class described, of the upright plate 3, having the vertical grooves 5, the upright plate 7, having the similar grooves 9 in its opposing face, and means for reciprocating said plate 7 horizontally across the face of said plate 3, substantially as described.

In testimony whereof I have hereunto set my hand this 20th day of December, 1886.

JOSEPH YATES.

Witnesses:
A. C. PAUL,
WM. DERWENT.